March 18, 1969     R. F. KALINA ET AL     3,434,024
CAPACITOR WITH CLOSURES AT END OF ARBOR HOLE
THEREIN AND METHOD OF MAKING THE SAME
Filed May 18, 1967
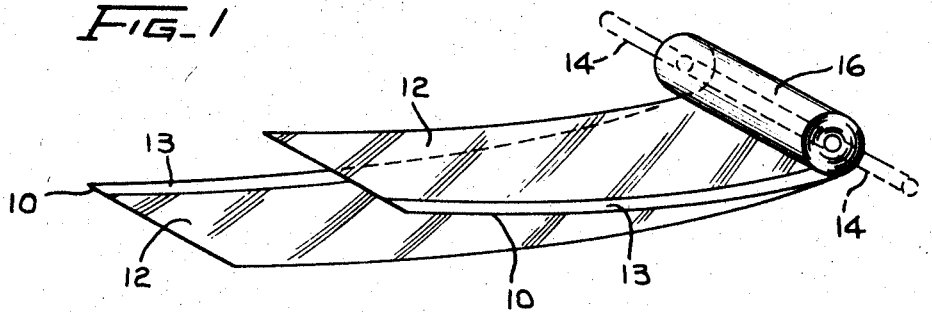
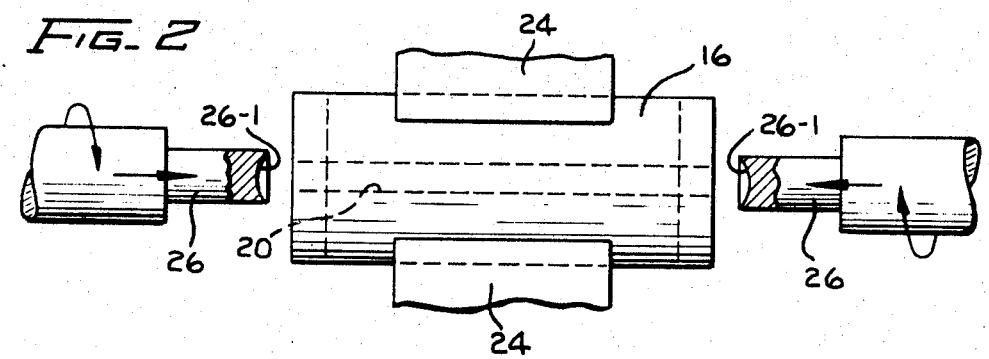
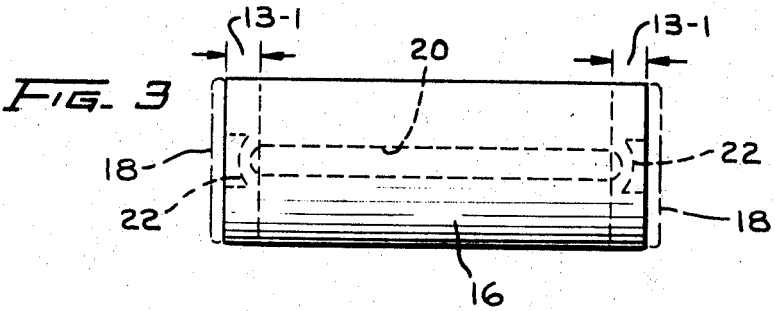
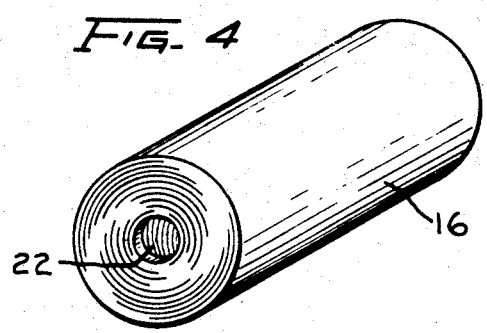
INVENTORS
R.F. KALINA
L.E. VERENSKI
BY A.C. Schwarz, Jr.
ATTORNEY United States Patent Office 3,434,024
Patented Mar. 18, 1969

3,434,024
CAPACITOR WITH CLOSURES AT END OF ARBOR HOLE THEREIN AND METHOD OF MAKING THE SAME
Robert F. Kalina, Lombard, and Lawrence E. Verenski, North Chicago, Ill., assignors to Western Electric Company, Incorporated, New York, N.Y., a corporation of New York
Filed May 18, 1967, Ser. No. 639,378
U.S. Cl. 317—260          5 Claims
Int. Cl. H01g 1/02, 13/00

ABSTRACT OF THE DISCLOSURE

A wound capacitor has an arbor hole which is closed at its ends to prevent solder from entering the hole. The closing is done by spin swaging only the portions of the ends of the capacitor adjacent the arbor hole.

BACKGROUND OF THE INVENTION

Field of the invention

This invention relates to wound metallized capacitors and more particularly to such capacitors having closures at the ends of the arbor holes therein, and to the method of making such capacitors.

Description of the prior art

In the fabrication of one type of metallized capacitor, two metallized webs are wound on an arbor into a capacitor roll with the pair of metallized electrodes thereof being of less width than the webs and extending, respectively, from opposite edges of the webs and the opposite ends of the capacitor roll. Molten solder is subsequently sprayed onto the ends of the capacitors to form terminals for the electrodes. However, to avoid the shorting of the terminals and electrodes by solder which may pass into the arbor hole in the capacitor roll during the solder spraying operation, it is necessary to close the ends of the arbor hole prior to such spraying of molten solder onto the ends of the capacitor. This may be done according to one method as disclosed in U.S. Patent No. 3,317,-982, granted to W. J. Fanning on May 9, 1967, wherein plugs of dielectric plastic material are inserted in the ends of the arbor hole. Obviously this requires the provision of plastic dielectric material extraneous to the capacitor and also mechanism for forming the plugs and inserting them into the arbor holes.

An object of the present invention is to provide improved wound metallized capacitors having closures at the ends of the arbor holes therein and a method of fabricating them.

A further object of the invention is to provide an efficient and effective method of masking the ends of the arbor holes in wound metallized capacitors without the use of material extraneous to the capacitors.

SUMMARY OF THE INVENTION

A method of masking the ends of the arbor hole of a capacitor, illustrating certain aspects of the invention, may include supporting the wound capacitor roll, between and in coaxial alignment with a pair of tools which are mounted for rotation and axial reciprocation and have concave end surfaces and a diameter greater than that of the arbor hole. The tools are rotated in opposite directions and pressed axially against and into the central portion of the capacitor surrounding the arbor hole at opposite ends of the capacitor and cause portions of the metallized webs thereat to be deformed inwardly into the ends of the arbor hole and form closures therefor.

BRIEF DESCRIPTION OF THE DRAWINGS

Other objects, advantages and novel aspects of the invention will become apparent upon consideration of the following detailed description, in conjunction with the accompanying drawings, in which:

FIG. 1 is a perspective view of a partially wound capacitor roll;

FIG. 2 is a view of the capacitor roll supported between a pair of tools for deforming portions of the ends of the capacitor adjacent the arbor hole;

FIG. 3 is a side view of the capacitor after the end portions of the capacitor have been deformed to effect the closure of the end portions of the arbor hole and showing in dotted lines solder terminals sprayed thereon; and FIG. 4 is a perspective view of the capacitor roll shown in FIG. 3.

DETAILED DESCRIPTION

Referring to the drawings, the capacitor is fabricated from a pair of dielectric webs 10 of the same width having electrodes 12 metallized on one side thereof, the metallized electrodes 12 being of less width than the webs 10 and extending from one longitudinal edge thereof and leaving a bare margin 13 adjacent the other longitudinal edge. The metallized webs are wound in superposed relation to each other on an arbor 14 into a capacitor roll 16 with the metallized electrodes 12 supported in superposed, insulated, and partially offset relation to each other and extending, respectively, from opposite ends of the roll. This leaves a zone 13–1 adjacent each end of the capacitor 16 in which a portion of only one electrode 12 is positioned.

Molten solder is subsequently sprayed onto the ends of the capacitor roll to form terminals 18—18, indicated in dotted lines in FIG. 3, in bonded engagement with the electrodes 12—12, respectively. Prior to the solder spraying of the terminals 18 onto the capacitor roll 16, the end portions of the latter are deformed adjacent to the arbor hole 20 therethrough and form closures 22 at opposite ends of the arbor hole to prevent the introduction of solder spray thereinto.

To form the closures 22—22, the capacitor roll 16 is supported in a holder 24 between and in coaxial alignment with a pair of forming tools 26 which are suitably supported for reciprocatory and rotary movements. As shown in FIG. 2 the tools 26 have concave ends 26–1 which are larger in diameter than the diameter of the arbor hole 20 and are designed to engage a predetermined portion of the end of the capacitor 16 surrounding the arbor hole.

Suitable mechanisms, not shown, are provided for rotating the tools rapidly in opposite direction and for reciprocating them axially into and out of engagement with the capacitor.

In response to simultaneous actuation, the rotating tools 26 are pressed a predetermined distance into the ends of the capacitor, and each tool engages portions of the bare margin 13 of a plurality of convolutions of one of the webs 12 and portions of the superposed metallized margin of a corresponding number of convolutions of the other web and spin forms and laterally displaces them inwardly into the arbor hole at one end of the capacitor and forms the closure 22 as indicated in FIGS. 3 and 4. The closures 22 which extend across and seal the ends of the arbor hole 20 are formed within the zones 13–1 and thus only one marginal portion of each metallized electrode 12 is deformed during the closure forming operation. During such closure forming operation portions of one metallized electrode 12 and of both of the dielectric webs 10 are arranged randomly on the outer surface of each closure 22.

On completion of the closure forming operation the ends of the arbor hole are completely closed and the capacitor is in condition to have solder terminals sprayed onto the ends thereof.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A capacitor having:
   a pair of elongated dielectric webs convolutely arranged in superposed relation to each other in a roll with a central longitudinal aperture therethrough and having, respectively, a metallized electrode on one face thereof, said electrodes being of less width than said webs and supported by said webs in insulated and partially offset relation to one another with one of said electrodes extending from one edge of the web at one end of the capacitor roll and said other electrode being spaced from the corresponding edge of the other web and at the same end of the capacitor roll, wherein the improvement comprises:
   a closure for the aperture consisting of the deformed convolutions of only those portions of both of the webs that are immediately adjacent to the aperture, leaving the remaining convolutions undeformed.

2. A capacitor according to claim 1 wherein the deformed portions of said webs comprise a metallized electrode portion of one of said webs and an unmetallized portion of the other of said webs.

3. A capacitor as defined in claim 1 including the provision of:
   a metallic terminal fused into place onto one end of the capacitor in engagement with the metallized electrode.

4. A method of fabricating capacitors which comprises:
   winding a pair of metallized dielectric webs about an arbor into a capacitor roll and removing the capacitor roll from the arbor, leaving a hole extending axially through the capacitor roll, wherein said dielectric webs, respectively, having an electrode metallized on one side thereof, and the electrodes, respectively, are of less width than the webs and extend from opposite edges of the webs and opposite ends of the capacitor; and
   spin forming dielectric portions of the ends of the capacitor roll that are adjacent to the arbor hole to close the ends of the hole, but leaving dielectric portions of the ends of the capacitor roll that are not adjacent to the arbor hole in a state substantially free of spin deformation.

5. A method of fabricating capacitors which comprises:
   winding a pair of metallized dielectric webs about an arbor into a capacitor roll and removing the capacitor roll from the arbor, wherein said dielectric webs, respectively, having an electrode metallized on one side thereof, and the electrodes, respectively, are of less width than the webs and extend from opposite edges of the webs and opposite ends of the capacitor; and
   spin forming each end of the capacitor for a distance less than the difference between the widths of the electrodes and the webs, to cause dielectric portions of the capacitor adjacent the arbor hole to be displaced into the hole and form closures for the ends thereof.

References Cited

UNITED STATES PATENTS

| 2,785,352 | 3/1957 | Netherwood | 317—260 |
| 2,969,488 | 1/1961 | Foster | 317—260 |
| 3,040,415 | 6/1962 | Rayburn | 317—260 X |
| 3,237,274 | 3/1966 | Kalina | 317—260 X |

FOREIGN PATENTS 811,332   2/1957   Great Britain.

OTHER REFERENCES

German printed application to Westerman, No. 1,118,886, Dec. 7, 1961.

LEWIS H. MYERS, *Primary Examiner.*

ELLIOT GOLDBERG, *Assistant Examiner.*

U.S. Cl. X.R.

29—25.42